(12) United States Patent
Lange

(10) Patent No.: US 8,798,845 B2
(45) Date of Patent: Aug. 5, 2014

(54) METHOD FOR AUTOMATICALLY DETERMINING A BOUNDARY OF A PARTIAL AREA OF A TOTAL AREA

(75) Inventor: Rainer Lange, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/988,448

(22) PCT Filed: Nov. 14, 2011

(86) PCT No.: PCT/EP2011/005715
§ 371 (c)(1),
(2), (4) Date: Sep. 10, 2013

(87) PCT Pub. No.: WO2012/065707
PCT Pub. Date: May 24, 2012

(65) Prior Publication Data
US 2014/0005878 A1    Jan. 2, 2014

(30) Foreign Application Priority Data

Nov. 19, 2010 (DE) .......................... 10 2010 051 713
Nov. 19, 2010 (DE) .......................... 10 2010 051 714
Jun. 17, 2011 (DE) .......................... 10 2011 105 255

(51) Int. Cl.
*G01C 21/34* (2006.01)
(52) U.S. Cl.
USPC ........................................ 701/29.1; 701/410
(58) Field of Classification Search
CPC  G01C 21/3469; G01C 21/3697; G06F 17/00; G06F 17/18
USPC ................................................ 701/29.1, 410
See application file for complete search history.

(56) References Cited

U.S. PATENT DOCUMENTS

| 5,539,399 A | 7/1996 | Takahira et al. |
| 2009/0234569 A1* | 9/2009 | Jansen et al. .................. 701/200 |
| 2011/0077854 A1* | 3/2011 | Fushiki et al. ................ 701/201 |

FOREIGN PATENT DOCUMENTS

DE    4344368    5/1995

(Continued)

OTHER PUBLICATIONS

G. Wagenknecht, "A contour tracing and coding algorithm for generating 2D contour codes from 3D classified objects," Pattern Recognition 40, 2007, pp. 1294-1306.

(Continued)

*Primary Examiner* — Mary Cheung
*Assistant Examiner* — Yuen Wong

(57) ABSTRACT

A method automatically determines a boundary of a partial area of a map, the partial area indicating the remaining range of a motor vehicle. The total area is divided into a matrix of rectangular area segments, with which a connected subset of the partial area is associated. Initially starting from a region of the total area not belonging to the partial area, a boundary area segment of the partial area is located and a first point describing the position of the boundary area segment is entered into a list of points, following which the process proceeds along the edge of the partial area and a point describing the position of the boundary area segment is entered into the list for each further boundary area segment located, until the boundary area segment corresponding to the first point is reached again. The boundary is determined from the list of points.

11 Claims, 5 Drawing Sheets

(56) References Cited

FOREIGN PATENT DOCUMENTS

| DE | 10302504 | 9/2004 |
|----|----------|--------|
| DE | 60308499 | 9/2007 |
| DE | 102007016108 | 10/2007 |
| DE | 102008037262 | 5/2009 |
| DE | 102009008327 | 8/2010 |
| DE | 102010051713.5 | 11/2010 |
| DE | 102010051714.3 | 11/2010 |
| DE | 102011105255.4 | 6/2011 |
| EP | 2172740 | 4/2010 |
| EP | 2641060 | 9/2013 |
| WO | PCT/EP2011/005715 | 11/2011 |

OTHER PUBLICATIONS

Ratika Pradhan et al., "Contour Line Tracing Algorithm for Digital Topographic Maps," International Journal of Image Processing, vol. 4, Issue 2, pp. 156-163.

Godfried Toussaint, "Chapter 2: Grids, Connectivity and Contour Tracing," http://cgm.cs.mcgill.ca/~godfried/teaching/mir-reading-assignments/Chapter-2-Grids-Connectivity-Contour-Tracing.pdf, Sep. 2, 2010, pp. 9-16.

English Language Translation of International Search Report for PCT/EP2011/005715, mailed on Feb. 23, 2012, 3 pages.

English Language Translation of the International Preliminary Report on Patentability, mailed May 23, 2013, 6 pages.

* cited by examiner

METHOD FOR AUTOMATICALLY DETERMINING A BOUNDARY OF A PARTIAL AREA OF A TOTAL AREA

CROSS REFERENCE TO RELATED APPLICATIONS

This application is based on and hereby claims priority to International Application No. PCT/EP2011/005715 filed on Nov. 14, 2011 and German Application Nos. 10 2010 051 713.5 filed on Nov. 19, 2010, 10 2010 051 714.3 filed on Nov. 19, 2010 and 10 2011 105 255.4 filed on Jun. 17, 2011, the contents of which are hereby incorporated by reference.

BACKGROUND

The invention relates to a method for automatic determination of a boundary of a partial area, in particular of a partial area indicating the remaining range of a motor vehicle. In addition the invention relates to a motor vehicle.

For different applications, in particular in medical technology or even in motor vehicle technology, it is known that a result of a data evaluation, in particular an evaluation of measurement data, is the assignment of rectangular area segments of a total area to a partial area. As an example of this, segmentation algorithms for image data are cited, with which certain pixels are assigned as area segments of a specified object described by the partial area. With such issues, with which a connected partial area of rectangular area segments is finally displayed superimposed on the total area, it is frequently desirable to have available a boundary, in particular a boundary line, of the partial area, in order to display these or similar, e.g. for delimiting the partial area from areas of the total area not belonging to the partial area. This particularly applies if the partial area describes information that is not directly visible from the data of the total area to be displayed, e.g. for a remaining range of a motor vehicle, which is to be displayed on a map together with the map data.

SUMMARY

One potential object is to specify a method that is simple to implement, requires little computing power and is reliable, in order to determine the boundary of such a partial area defined in a matrix of area segments by a computing device.

In order to achieve this object, the inventor proposes a method for automatic determination of a boundary of a partial area, in particular of a partial area indicating the remaining range of a motor vehicle, of a total area, in particular a map, wherein the total area is divided into a matrix of rectangular area segments, to which a connected subset of the partial area belongs. A boundary area segment of the partial area is initially located starting from a region of the total area not belonging to the partial area and a first point describing the position of the boundary area segment is entered into a list of points, after which the method proceeds along the edge of the partial area and a point describing the position of the boundary area segment is entered into the list for each further located boundary area segment, until the boundary area segment corresponding to the first point is reached again, wherein the boundary is determined from the list of points.

An efficient and rapid algorithm is thus proposed, in order to provide the boundary of a partial area. Broadly speaking, an area segment at the edge of the partial area is initially located, in order to open a list with a first point. The points can thereby comprise position information in the matrix (e.g. rows/columns), wherein it is of course also conceivable to define the points in a different way, e.g. in the case of a map as an accurate position on the map. If the edge of the partial area has initially been located in this manner, then it is proposed to finally "sample along" the outer edge of the partial area until again reaching the first area segment, which is ensured because the partial area is connected. The procedure can also be referred to as "creeping along the outer edge" or "crawling". Whenever a new boundary area segment is located in this way, a corresponding point is added to the list, which can be implemented e.g. as a data structure such as a vector or similar. This procedure is essentially the recommended way in which one would manually construct an outer boundary. Moreover, it is thereby irrelevant whether the partial area can comprise within it areas not belonging to the partial area, e.g. holes, when it comes to the outer boundary that is located in each case at a connected area. If e.g. a matrix structure is assumed, in which each area segment of the total area is assigned the information "belongs to the partial area" or "does not belong to the partial area", e.g. as a Boolean variable, a particularly simple implementation is possible. Finally, a list of points is constructed, which is arranged in order so that a boundary line can be located, e.g. by connecting the points. This can e.g. be used when the partial area is displayed, especially together with the total area.

In this case, for simplicity, a case is assumed below in which the partial area lies within the total area, i.e. not touching the edge of the matrix. There are a plurality of options in order to be able to elegantly consider cases in which the partial area contacts the edge of the total area.

Thus it can e.g. be provided that the total area is extended outwards in each direction in each case by a further area segment not belonging to the partial area. Finally, two rows and two columns are added to the matrix in this way, which enclose the total area and certainly do not belong to the partial area, so that the algorithm does not have to additionally capture special cases in which the partial area contacts the edge.

However, it is also conceivable, for a partial area contacting the edge of the matrix, to proceed along the edge of the matrix until an area segment at the edge of the matrix not belonging to the partial area is reached again. In this case it is then checked whether the currently considered boundary area segment is also a boundary segment of the matrix, according to which it is determined how long the partial area is in contact with the matrix and ultimately this edge section is also regarded as part of the boundary of the partial area. Clearly different options are conceivable for covering the special case whereby the partial area contacts the edge of the matrix.

The proposed method can be implemented by a computer program that is executed on a suitable computing device that implements the method.

In a specific embodiment, the following steps can be carried out:

a) starting from an area segment not belonging to the partial area, in particular an edge of the total area, locating the first boundary area segment encountered along a path belonging to the partial area as the current boundary area segment along the path in a current search direction extending along a row or column of the matrix, then carrying out the following steps to locate other boundary area segments until again reaching the first boundary area segment from a different boundary area segment:

b) checking whether, in a specified second search direction perpendicular to the current search direction, there is a further boundary area segment of the partial area adjacent to the area segment not belonging to the partial area and adjacent to the first boundary area segment in the direction opposite to the current search direction, c) If the check of step b) gives a positive result, setting the other boundary area segment as the current boundary area segment and the second search direction as the current search direction and continuing with step b), d) Otherwise checking whether there is a further boundary area segment adjacent to the current boundary area segment in the second search direction, e) If the check of step d) gives a positive result, setting the further boundary area segment as the current boundary area segment, retaining the current search direction and continuing with step b), f) Otherwise retaining the current boundary area segment, setting the current search direction to a search direction opposite to the specified second search direction and continuing with step b).

The matrix is thus initially scanned in an algorithm, e.g. along a path defined by two nested "For"-loops, until the first "inner" area segment is located that belongs to the partial area. As described above, this then also defines the first point in the list and is the starting point for the location of the rest of the boundary. The first area segment is encountered in a certain direction, which is then set as the current direction for the subsequent steps of the "crawler" portion.

In principle, four different search directions can be supported in the specific example of the rectangular matrix e.g. in the direction of the rows (two search directions) and in the direction of the columns (two further directions). In an intuitive view, the search directions can be referred to as "searching up", "searching down", "searching left" and "searching right". The basic principle is, however, always the same irrespective of the current search direction. The idea underlying the specific process is that the current area segment from which a test series is started remains a boundary area segment and a test area segment (adjacent to the boundary area segment opposite to the search direction) that lies outside the partial area is thus always defined using the current search direction.

Assuming in a first example a current search direction of "upward", and if it is further assumed that the determined second direction is a direction rotated clockwise by 90° from the first direction, scanning is thus always continued to the right from the current search direction, so the first check in step b) can also be formulated as "is there a right neighbor of the test area segment?". If there is such a boundary area segment of the partial area as a right neighbor of the test area segment, the current search direction of "upward" is changed to "to the right" and the process is continued at this point again with step b). Assuming, however, that there is no boundary area segment belonging to the partial area on the right and adjacent to the test area segment, in the example of the "upward" search direction it is checked next in step d) whether there is a further boundary area segment belonging to the partial area on the right and adjacent to the current boundary area segment. If this is the case then the boundary area segment is defined as the new current boundary area segment, but the search direction remains "upward". Here the test area segment, i.e. the area segment adjacent to the current boundary area segment on the side opposite to the current search direction, which does not belong to the partial area, remains outside the partial area, it having first checked in step b) whether there is a boundary area segment of the partial area at this position.

However, in the case that there is no further boundary area segment adjacent to the current boundary area segment, the test area segment moves to this position, step f), in that the current boundary area segment itself remains, but the search direction in the example considered here changes to "to the left". This process of course also applies to each of the three other basic possible search directions.

The basic principle that is specified in the specific embodiment, if the specified second direction is a direction rotated clockwise by 90° from the first direction, thus includes the following two decisions and four actions:

Is there a right neighbor of the test area segment? If so, with the same test area segment change the current direction to the right, if not continue with the second check:

Is there a right neighbor of the current boundary area segment? If so, proceed to the right with the same current search direction, if not, use the checked position as the new test area segment and change the current search direction to the left towards the current boundary area segment.

This basic principle is the same for all searches. Starting from the first boundary area segment and the first test area segment checking always proceeds to the right, which means that searching will proceed to the right about the partial area ("crawling"). Of course it is also possible to move to the left about the partial area, which means that the determined second direction is a direction rotated anti-clockwise by 90° from the first direction. The algorithm is symmetrical in this respect. In the implementation of the computer program the algorithm described here can be implemented with four "If" queries.

As already mentioned, the proposed method can be implemented with particular advantage in respect of a residual range display in a motor vehicle. Thereby the result of an algorithm determining the remaining range of the motor vehicle can be a partial area, which means a plurality of rectangular area segments characterized as "in range" (and thus belonging to the partial area). All other area segments are "not in range" (and thus do not belong to the partial area). In order to be able to advantageously display the determined partial area, the boundary can now be determined and can be taken into account when controlling a display device for displaying the partial area on the total area, in this case the map. For background, the remaining range functionality will be briefly explained.

Motor vehicles with energy storage systems for their drives acting on at least one wheel of the motor vehicle have a remaining range that depends on the energy currently stored in the energy storage system. The energy storage system can thereby comprise a fuel tank and/or a battery. In principle, methods are already known for determining the remaining range of a motor vehicle and bringing it to the attention of a driver using a display device. In this case e.g. such a determined partial area can be shown superimposed on a map illustration of a navigation system. Such a procedure is e.g. known from DE 10 2008 037 262 A1.

In a plurality of methods the use of algorithms is known that provide a plurality of destination points on the map that can still be reached with the energy of the motor vehicle currently contained in the energy storage system. This means that the energy still stored in the energy storage system is consumed at these destination points. The so-called Dijkstra algorithms are usually used here, i.e. classic path-finding algorithms, which process stepwise from branch to branch on the map and operate with a cost function, which focuses on the energy costs of traveling the section of the route during determination of the remaining range. In the subsequently published DE 10 2010 051 546.9-53 an alternative to the Dijkstra algorithm was proposed, wherein instead of the use of the map data as with the Dijkstra algorithm it is proposed to base them on area segments, with which respective energy costs are associated, possibly depending on direction, which are required to traverse the respective area segment. Thus there is an expansion in all possible directions, starting from the area segment in which the current position of the motor vehicle is located, so that the result of the algorithm described there is a plurality of end area segments as destination points, from which a boundary of a partial area can result.

However, it has been determined that with such algorithms producing a scatter plot of maximum points or area segments that are still in range, wherein the destination points are stored at which the still available residual energy is consumed, problems occur because a partial area that is described by connecting the destination points, e.g. for binding a polygon by a polygonal line, for which e.g. the known "convex envelope" algorithm can be used, does not always exactly or usefully describe the areas of the map that can still be reached with the remaining energy. Here, according to tests conducted by the applicant, errors of e.g. 30-40% can occur, which means that e.g. 30% of the displayed remaining range areas could no longer really be within range. In particular, degenerative special cases can occur, e.g. where certain areas are not accessible by transport links. If one is e.g. at the corner of an island, it can be that in certain areas around the current position of the motor vehicle there are no determined destination points within range, as there is quite simply only the sea, but no roads. If the partial area is now calculated from destination points, e.g. as the result of an envelope calculation, in particular of a convex envelope, about the Dijkstra destination points, actually accessible areas are excluded. However, other effects also lead to errors.

It can thus be provided to solve the problem that for a map described by features, wherein the remaining range is determined depending on the energy stored in the energy storage system by an expanding algorithm starting from the current position of the motor vehicle, the area element is added to the partial area whenever a feature lying in an area segment or corresponding to an area segment is added during the expansion. In this way the partial area in its basic form is already determined for the maximum in-range destination points during the execution of the path-finding algorithm. Individual area segments are marked as "visited" or "in range", so that there is a partial area that can be used in the proposed method, which is inevitably connected and is defined by area segments of a total area, i.e. the map, lying within a matrix. With a procedure in which area segments are marked during a path-finding algorithm, it is thus ultimately irrelevant whether a destination point is actually reached at which the energy stored in the energy storage system is fully used up, as with considered routes that finish in a dead end or similar, the corresponding area segments can also be marked as belonging to the partial area. In this way not only is higher accuracy in the calculation of the residual range partial area achieved, but degenerative special cases are eliminated.

In a particularly advantageous embodiment, it can thus be provided that for determination of the partial area describing the remaining range of a motor vehicle in the map using an algorithm based on the energy costs associated with the area segment for traveling through the area segment, with which it is expanded during path finding to respective adjacent area segments, starting from the current position of the motor vehicle, until the residual energy contained in an energy storage system for a drive acting on at least one wheel of the motor vehicle has been consumed, each area segment visited during path finding by the algorithm is marked as belonging to the partial area. Of course besides the algorithm based on area segments provided with energy costs, e.g. disclosed in the subsequently published patent application DE 10 2010 051 546.9-53, other algorithms are also conceivable, e.g. normal Dijkstra algorithms with which an area segment of the map is marked as belonging to the partial area if a feature of the map visited by the algorithm lies within the area segment. A residual range algorithm is thus initially executed, whose result is a matrix of area segments, all bearing the individual information "in range" or "not in range". "In range" area segments form the partial area. It should be noted at this point that of course the partial area can comprise internal "holes", as areas without road coverage can exist.

In other embodiments it can generally be provided that a center point and/or another distinguished point of the area segment is considered as a point for determination of a line representing a boundary of the partial area. It is thus conceivable to determine a boundary line from the points, wherein distinguished points of the area segment, in particular a center point, are considered. The points can be connected so that e.g. a polygonal line is determined as a boundary, the partial area thus being represented as a polygon by its boundary line.

It is particularly advantageous if the determined boundary is used to represent the partial area together with the total area, in particular the map. The determined information regarding the boundary, in particular the boundary line, is thus used to control a display device, in particular in a motor vehicle, so that the partial area can be indicated by its boundary within its total area, in particular map data of the map illustrated by a navigation system.

In particular, together with the described residual range calculation, which provides the partial area as a result, a particularly advantageous overall concept for the determination, preparation and display of a remaining range of a motor vehicle results, which is simple to implement and can be executed with low computing costs.

Besides the method, the inventor proposed a motor vehicle comprising a drive acting on at least one wheel of the motor vehicle, an energy storage system for a drive and a computing device designed to carry out the proposed method in relation to a partial area describing the remaining range of the motor vehicle. Other embodiments in relation to the method can be applied by analogy to the proposed motor vehicle, so that the advantages discussed above, which in particular arise in combination with an algorithm marking area segments of a map, can be achieved.

The energy storage system can comprise a fuel tank and/or a battery. The method can thus be used both in purely internal combustion engine motor vehicles and electric motor vehicles and also in hybrid vehicles.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
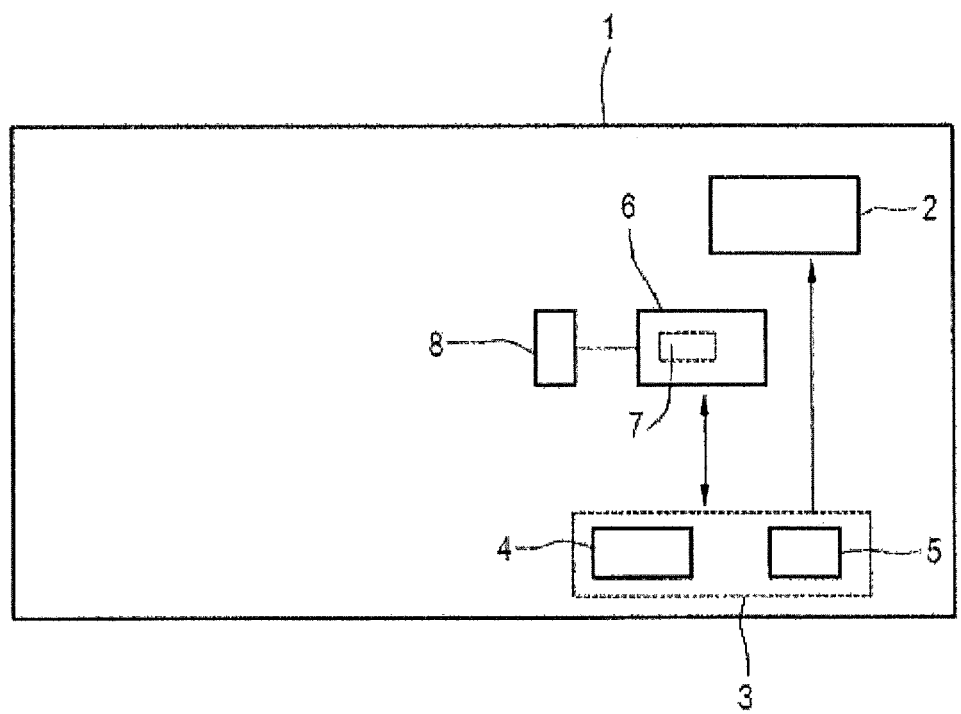
FIG. 1 shows a sketch of the principle of the proposed motor vehicle.

Reference will now be made in detail to the preferred embodiments of the present invention, examples of which are illustrated in the accompanying drawings, wherein like reference numerals refer to like elements throughout.

FIG. 1 shows a sketch of the principle of the proposed motor vehicle 1. In the present case this is a hybrid vehicle, which means that the energy storage system 3 associated with the drive 2 acting on at least one wheel of the motor vehicle 1 comprises both a fuel tank 4 and also a battery 5. Data about the residual energy currently available in the energy storage system 3 are passed on to a navigation system 6, which comprises a computing device 7. The computing device 7 is designed to carry out the proposed method.

Using a path-finding algorithm based on energy costs associated with area segments into which a map is divided for traversing the area segment, it determines a partial area that describes the areas of the map that the motor vehicle 1 can still reach with the available residual energy, i.e. the remaining range of the motor vehicle. The result of the algorithm is all area segments that have been visited by the algorithm, i.e. a connected partial area that is formed of area segments. The map thus forms a matrix of area segments as the total area and the partial area is formed by a connected sub-quantity of area segments. In the present case this is simply realized by each area segment having an associated Boolean indicator of whether the area segment of the partial area is accessible ("in range") or not accessible ("not in range"). Furthermore, in the computing device 7 the boundary of the partial area is determined, wherein the process proceeds along the edge of the partial area until a first located boundary area segment is reached again, which will be explained in more detail below.

The navigation system 6 is furthermore connected to a display device 8, which using the specified boundary of the partial area can be controlled in such a way that the partial area describing the remaining range can be displayed together with the map, i.e. the total area.

Figure 2:
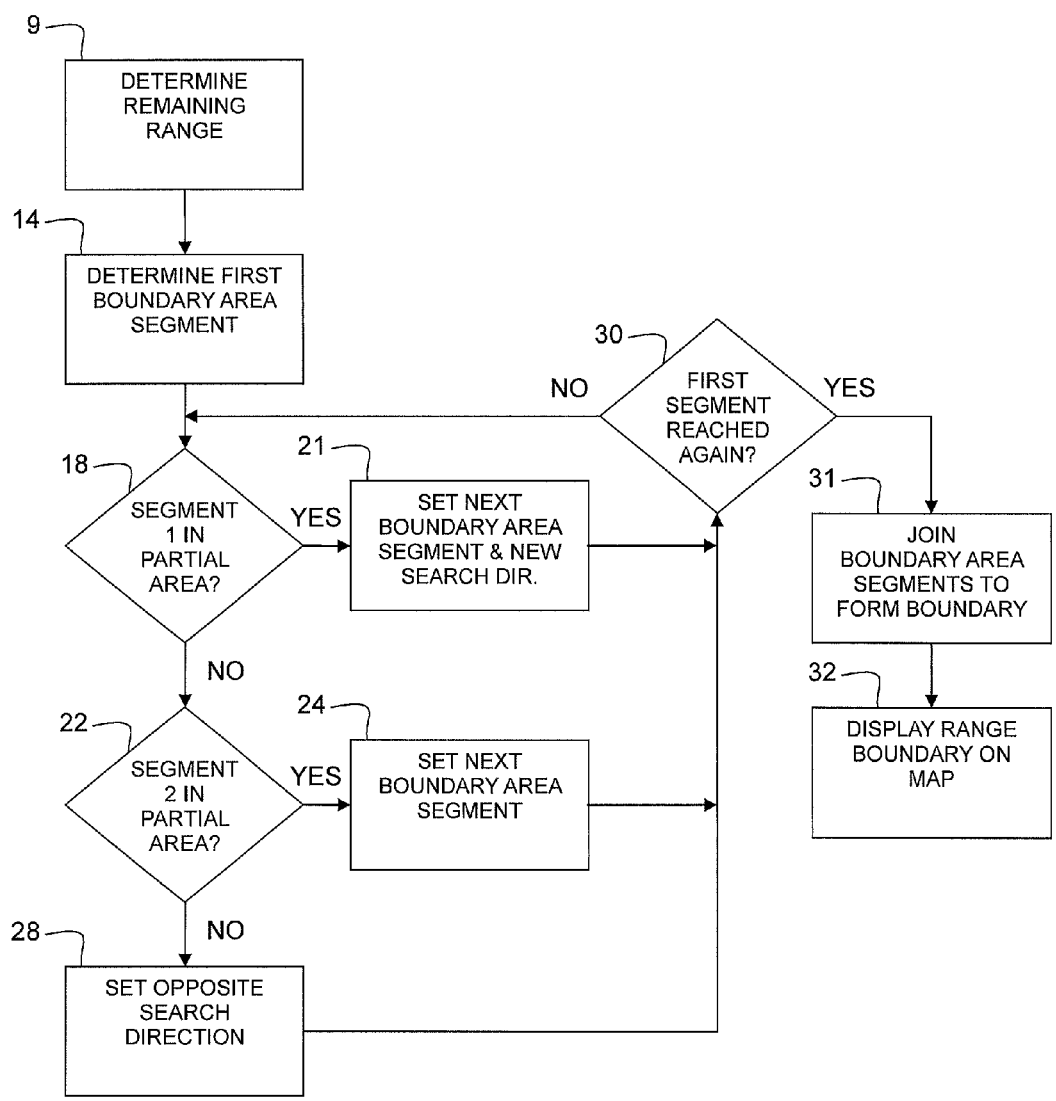
FIG. 2 shows a flow diagram of the proposed method.

FIG. 2 shows a flow diagram of an exemplary embodiment of the method. The remaining range of the motor vehicle is first determined therein in a step 9 using a path-finding algorithm, as described by the subsequently published patent application DE 10 2010 051 546.9-53. This starts from an area segment that corresponds to the current position of the motor vehicle 1. Energy costs are now assigned to all area segments of the map, possibly direction dependently, which specify how much of the remaining residual energy it costs the motor vehicle 1 to traverse the area segment. Starting from a starting area segment, the process is now expanded until the residual energy still remaining in the energy storage system has been consumed, wherein during the expansion each visited area segment is marked as "in range". Thus in the course of step 9 the partial area arises that describes the remaining range of the motor vehicle 1. At the end of the path-finding algorithm there are thus some connected area segments in the matrix of the rectangular area segments that are marked as "in range", thus resulting in the partial area.

Figure 3:
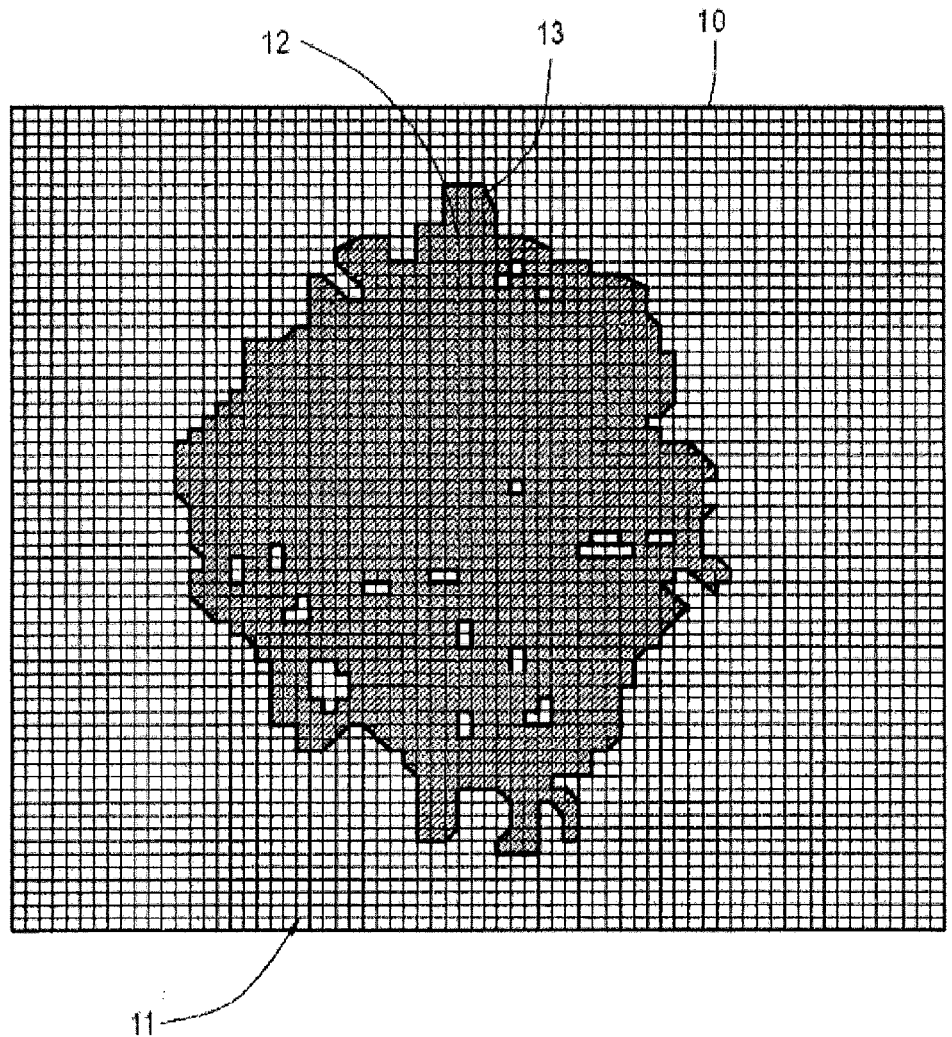
FIG. 3 shows a possible partial area in a matrix of area segments.

This is illustrated in detail in FIG. 3 using an example.

The map 10, whose map data is not shown here in the interests of a simpler illustration, is clearly divided into a matrix of rectangular area segments 11 of a certain size. The partial area 12 is located entirely within the matrix in this case. The objective is to locate a boundary 13 of the partial area 12, in the present example in the form of a boundary line, in order to enable improved representation of the remaining range together with the map data on a display device 8.

This objective is achieved by the steps described below, wherein for a simpler representation it will be assumed that all area segments of the partial area 12 are at a distance from the edge. Moreover, this state can also be easily produced artificially by adding to each side of the matrix a row or column of matrix elements not belonging to the partial area 12. However, other special case treatments are also conceivable for handling partial areas 12 that extend to the edge of the map 10.

It should be noted at this point that the size of the area segments illustrated in FIG. 3 is of course to be treated as an example; ultimately, the size of the area segments can be freely selected depending on the desired accuracy.

In the method a boundary area segment of the partial area should initially be located, which as the first boundary area segment forms the starting point for a "movement along" (crawling) along the outer edge of the partial area 12. For this purpose, in a step 14 starting from the edge of the total area, i.e. in an area segment not belonging to the partial area, checking is carried out along a path as to whether the area segments encountered thereby belong to the partial area. If such a first boundary area segment belonging to the partial area (there is inevitably one of these) is located, then the process is terminated and the first boundary area segment belonging to the partial area is set as the current boundary area segment. The search direction in which the boundary area segment is encountered is specified as the current search direction.

A list is opened, in which a point is entered that describes the position of the first boundary area segment, e.g. the position of the boundary area segment in the matrix and/or the center point of the boundary area segment. Subsequently, all points associated with further boundary area segments that are located are likewise entered into the list.

Figure 4:
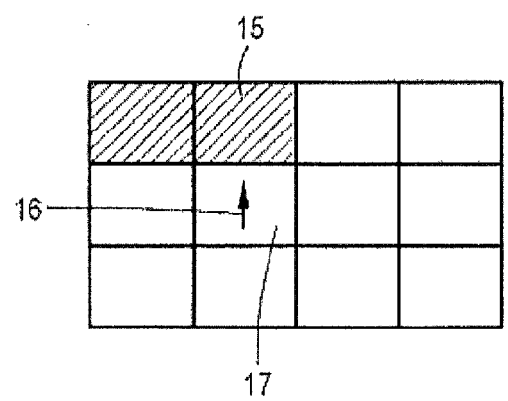
FIG. 4 through FIG. 7 show sketches of individual steps of the method.

A possible situation that arises after locating the first boundary area segment 15 is illustrated in FIG. 4. The first boundary area segment 15 was encountered in the search direction indicated by the arrow 16, which thus represents the current search direction. The area segment from which the boundary area segment 15 was encountered in the search direction, i.e. the area segment adjacent to the boundary area segment 15 in the direction opposite to the search direction, is referred to below as test area segment 17. Test area segment 17 is basically located outside of the partial area 12 and is ultimately the area segment from which as it were "scanning" takes place from the edge of the partial area 12.

The scanning, according to which the boundary area segment 15 was defined as the current boundary area segment, the search direction according to arrow 16 was defined as the current search direction and the test area segment 17 was defined as the current test area segment, will now be explained in detail. The end condition, i.e. the condition for the entire boundary 13 of the partial area 12 having been located, is that the first boundary area segment 15 has been located again starting from a different current boundary area segment.

Thereby within the matrix there are basically four mutually perpendicular search directions, namely along the columns or along the rows. For simplicity, the basic principle of the method will be explained below for the case illustrated in FIG. 4, in which the current search direction is "upward". The embodiments can of course be applied by analogy to any other possible search direction. In the following exemplary embodiment it will further be assumed that a second considered search direction arises from the current search direction by rotating clockwise by 90°; in the illustrated exemplary embodiment the search direction "upward" is the current search direction and the second search direction is thus "to the right".

Figure 5:
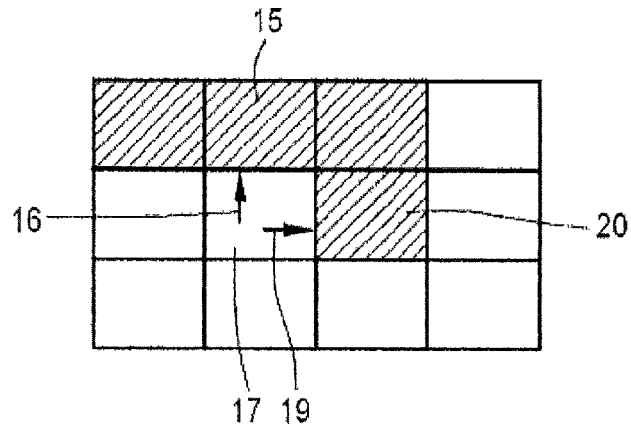

In a step 18 a check is now made as to whether in the second search direction—i.e. "to the right"—there is a further boundary area segment 20 belonging to the partial area 12 adjacent to the test area segment 17, which is illustrated in detail by the exemplary situation in FIG. 5, in which the second search direction is symbolized by arrow 19. If the check shows that the area segment adjacent to the test area segment 17 is actually a boundary area segment 20 of the partial area 12, then in a step 21 the other boundary area segment 20 is set as the new current boundary area segment 15 and the second search direction, symbolized by arrow 19, is selected as the new search direction. The process is then continued again at step 18.

Figure 6:
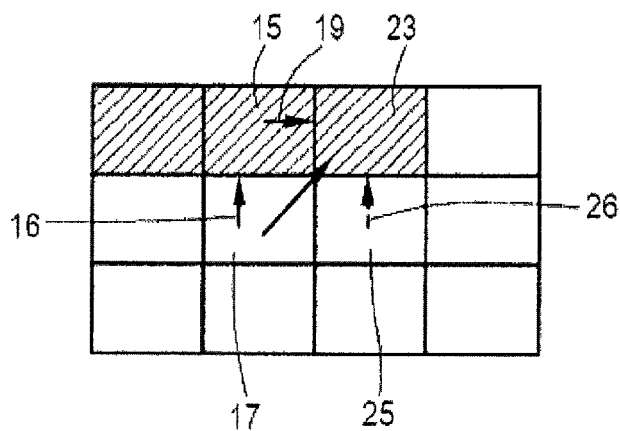

However, if the check of step 18 shows that the area segment on the right and adjacent to test area segment 17 is free, i.e. does not form part of the partial area 12, then the process will be continued with step 22. A further check takes place there, namely, as for example in a situation illustrated by FIG. 6, whether the area segment to the right of and adjacent to the current boundary area segment 15 is a further boundary area segment 23, i.e. whether the area segment to the right of and adjacent to the current boundary area segment 15 is a boundary area segment 23 belonging to the partial area 12. Scanning thus now takes place diagonally to the right starting from the test area segment 17.

If there is such a further boundary area segment 23, then in a step 24 the further boundary area segment 23 is defined as the new current boundary area segment 15, the current search direction remaining unchanged, so that the current test area segment 17 is likewise shifted by a step to the right onto the area segment 25 not belonging to the partial area. That the segment 25 cannot be a boundary area segment of the partial area 12 is already known from the check in step 18. The process is then continued with step 18 using the new situation, as illustrated by the dashed arrow 26.

Figure 7:
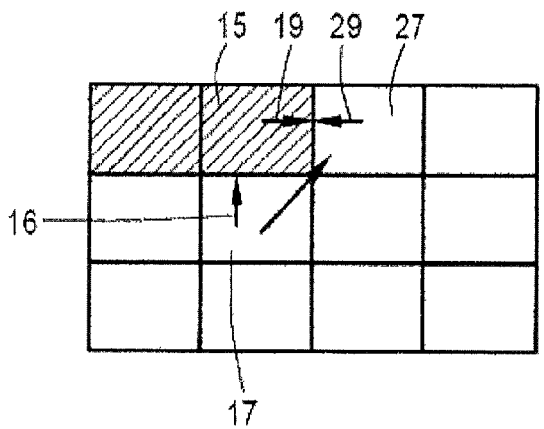

Finally, it remains to consider the case in which it is determined in step 22 that the area segment to the right of and adjacent to the current boundary area segment 15 does not belong to the partial area 12, which is illustrated using an example in FIG. 7. It is apparent there that area segment 27 is unoccupied.

In a step 28 for this case the current boundary area segment 15 is retained, however the search direction is changed to the direction opposite to the second search direction, i.e. to the left in this case, arrow 29. The result of this is that the current test area segment 17 is now set as the area segment 27. Following this change of the definition of the current search direction 29 (and consequently of the test area segment) the process is continued again with step 18.

The overall result of this is that the process proceeds to the right, i.e. anti-clockwise, along the edge of the partial area 12, wherein each newly encountered boundary area segment is marked as a point in the list. The result is thus, once the first boundary area segment has again been reached, dashed arrow 30, an existing list of points, which are now joined in the present exemplary embodiment in a step 31 to form a boundary line, resulting in a polygon, as has also already been illustrated in FIG. 3 as boundary 13.

Figure 8:
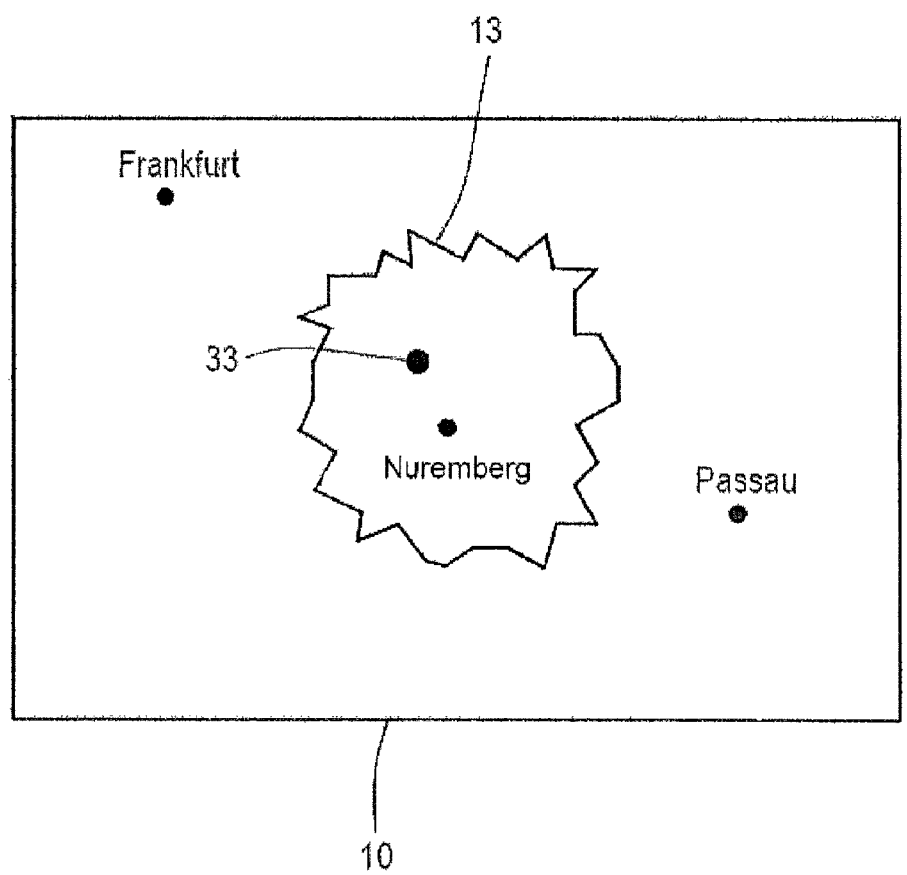
FIG. 8 shows a possible display of the partial area in a map.

This information is now used in a step 32 to control the display device 8 in order to be able to display the partial area 12 describing the areas within range together with the map data of map 10 on the display device 8, wherein an exemplary display is illustrated in FIG. 8 as a sketch of the principle. The map data of map 10, e.g. roads, locations and similar, is also shown superimposed on the boundary 13 besides the current position 33 of the motor vehicle 1.

The steps 14 as well as 18, 21, 22, 24 and 28 explained by way of example can be written down as follows as a pseudocode algorithm. The step 14 can be described by the following procedure:

```
all: for (i=0;i<numberOfRectsLon;i++)  {
for (j=0;j<numberOfRectsLat; j++)  {
if (inside (i,j))) {
// x and y are the coordinates of the rectangle
p = new Point (x,y);
// add this first point, e.g. to a vector v,
// in which all results points are held in the
// correct sequence
v.add(p);
// we can stop now- the starting point has been located
break all;
}
}
}
```

Here the function "inside" checks whether the area segment at position i, j of the matrix is part of the partial area 12. The process thus runs through the matrix line-by-line and column-by-column until the first boundary area segment has been located. The variable "v" represents the list.

Likewise, the checks and actions described by steps 18, 21, 22, 24 and 28 are described by a pseudocode as follows (therein i and j are the position of the test area segment):

```
if (crawl_dir == CRAWL_UP) {
if (inside (i+1,j)) {
// test for right neighbors
p = new point (x,y);
//add this point to result vector v
v.add (p);
// change crawl direction
crawl_dir = CRAWL_RIGHT;
// start directly with the new loop
continue;
} else if (inside (i+1,j+1))) {
// test the diagonally right rectangle
p = new point (x,y)
// add this point to result vector v
v.add (p);
// move one position to the right
i = i+1;
} else {
// diagonally right no neighbor located, jump there
// and
// change search direction to "left"
i = i+1;
j = j+1;
crawl_dir = CRAWL_LEFT;
continue;
}
}
```

The current search direction "upward" is again shown here as an example case; of course there are also other possibilities for implementing the method as a computer program, in particular, by handling all possible search directions in a common code.

Such a computer program, which implements the method, can be stored on the computing device 7.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for automatically determining a boundary, comprising:
dividing, by a processor, a total area of a map into a matrix of rectangular area segments;

determining a partial area of the map, the partial area being associated with a connected subset of the rectangular area segments, the partial area being determined using an algorithm that determines a remaining range of a motor vehicle;

initially starting from a region of the total area not belonging to the partial area, finding a first boundary area segment of the partial area;

entering a first point describing a position of the first boundary area segment into a list of points;

after entering the first point, stepping along an edge of the partial area;

for each further boundary area segment that is found, entering a corresponding further point describing a position of the further boundary area segment into the list of points; and when the first boundary area segment is reached again, determining the boundary from the list of points.

2. The method as claimed in claim 1, wherein finding the first boundary area segment of the partial area comprises:

starting from an area segment not belonging to the partial area, checking along a path in a current search direction until the first boundary area segment is encountered, the current search direction extending along a row or column of the matrix; and setting the first boundary area segment as the current boundary area segment, and wherein stepping along the edge of the partial area and finding further boundary area segments comprises:

a) setting a last-not-occupied area segment as a test area segment, the last-not-occupied area segment being an area segment not belonging to the partial area and adjacent to the current boundary area segment on a side of the current boundary area segment opposite the current search direction;

b) checking whether, in a second search direction perpendicular to the current search direction, there is a further boundary area segment of the partial area adjacent to the test area segment;

c) if checking in b) gives a positive result, setting the further boundary area segment as the current boundary area segment, setting the second search direction as the current search direction and repeating a) and b);

d) if checking in b) gives a negative result, checking whether there is a further boundary area segment adjacent to the current boundary area segment in the second search direction;

e) if checking in d) gives a positive result, setting the further boundary area segment as the current boundary area segment, retaining the current search direction and repeating a) and b); and f) if checking in d) gives a negative result, retaining the current boundary area segment, setting the current search direction to a direction opposite to the second search direction and repeating a) and b).

3. The method as claimed in claim 2, wherein finding the first boundary area segment starts from an area segment at an edge of the total area and not belonging to the partial area.

4. The method as claimed in claim 2, wherein the second search direction is a direction rotated clockwise by 90° from the current search direction.

5. The method as claimed in claim 1, wherein the algorithm used to determine the partial area associates with each area segment an energy cost for traversing the area segment, the algorithm comprising:

starting from a starting area segment corresponding to a current position of the motor vehicle;

finding paths from the starting area segment by expanding from the starting area segment on paths to respective adjacent area segments, each path being continued until a residual energy contained in an energy storage system for a drive acting on at least one wheel of the motor vehicle has been consumed; and marking each area segment visited while finding paths as an area segment associated with the partial area.

6. The method as claimed in claim 1, wherein each point in the list of points represents a center point of a boundary area segment, and the boundary is a line determined from the list of points.

7. The method as claimed in claim 1, wherein a polygon is determined as the boundary.

8. The method as claimed in claim 1, further comprising displaying the total area of the map using the boundary to offset the partial area from the total area.

9. The method as claimed in any claim 1, wherein the partial area does not contact any edge of the matrix.

10. The method according to claim 1, wherein, if the partial area contacts an edge of the matrix, the boundary is determined by advancing along the edge of the matrix until an area segment at the edge the matrix not belonging to the partial area is located.

11. A motor vehicle, comprising:

a drive acting on at least one wheel of the motor vehicle;

an energy storage system for the drive; and a computing device to automatically determine a boundary by a method comprising:

dividing a total area of a map into a matrix of rectangular area segments;

determining a partial area of the map, the partial area being associated with a connected subset of the rectangular area segments, the partial area being determined using an algorithm that determines a remaining range of the motor vehicle;

initially start from a region of the total area not belonging to the partial area, finding a first boundary area segment of the partial area;

entering a first point describing a position of the first boundary area segment into a list of points;

after entering the first point, stepping along an edge of the partial area;

for each further boundary area segment that is found, entering a corresponding further point describing a position of the further boundary area segment into the list of points; and when the first boundary area segment is reached again, determining the boundary from the list of points.

* * * * *

UNITED STATES PATENT AND TRADEMARK OFFICE
CERTIFICATE OF CORRECTION

PATENT NO. : 8,798,845 B2
APPLICATION NO. : 13/988448
DATED : August 5, 2014
INVENTOR(S) : Rainer Lange It is certified that error appears in the above-identified patent and that said Letters Patent is hereby corrected as shown below:

In the Claims

Column 12, Line 27, Claim 9, before "claim" delete "any".

Signed and Sealed this
Ninth Day of December, 2014

Michelle K. Lee
*Deputy Director of the United States Patent and Trademark Office*